United States Patent Office 2,875,169
Patented Feb. 24, 1959

2,875,169

VINYLIDENE CHLORIDE POLYMER COMPOSITION PLASTICIZED WITH DI-N-PROPYL TETRACHLOROPHTHALATE AND PROCESS OF EXTRUDING SAME

Robert J. Reid, Canal Fulton, Ohio, and Jacob D. Matlack, Whippany, N. J., assignors to The Firestone Tire & Rubber Company, Akron, Ohio, a corporation of Ohio No Drawing. Application December 11, 1953
Serial No. 397,776

13 Claims. (Cl. 260—31.8)

This invention relates to the use of di-n-propyl tetrachlorophthalate as a plasticizer in the hot melt extrusion of crystalline polymers and copolymers of vinylidene chloride.

These crystalline polymeric resins have been known for some time. They have been used to a substantial extent in the manufacture of films and filaments for various purposes, but the extrusion has presented various difficulties. The high temperatures necessary for processing are very close to the decomposition temperature of the composition. Therefore, it is essential that some additive be used which will lower the processing temperature below the critical range without having any undesirable effect on the products obtained.

Such resins are characterized by crystalline behavior, i. e., they fuse sharply to form relatively fluid melts. On quenching and orienting, the extruded filaments and films are crystalline in character. A syndrome of this crystalline habit is the recalcitrance of these resins to compounding: The macromolecules of these resins prefer contact with each other and tend to reject any foreign substances such as plasticizers and the like. In the random structure obtained without orientation any added ingredient of limited compatibility, such as the plasticizer of this invention, is retained in larger percentages than is possible in the stretched or oriented products. On stretching, the tendency toward exudation or spewing is considerably increased. In orienting films and filaments of vinylidene resins they are stretched to several times their original length, and ordinarily until there is a sharp rise in the modulus. It is difficult to provide suitable plasticizers which do not exhibit an undesirable spew or bloom on the surface of the oriented products and which in addition possess good heat and light stability or which at least are not detrimental to such stability.

Thus, the problem of providing plasticizers for these crystalline resins is complicated not only by the fact that they tend to reject and spew the majority of conventional plasticizers, but, because the resins are extruded as hot melts at temperatures in the neighborhood of, for example, 170° C., many conventional resin-compounding ingredients tend to decompose or react with other compounding ingredients which are present when the resins are maintained in a molten state immediately prior to and during extrusion.

The crystalline resins to which the plasticizer of this invention are added include both homopolymers of vinylidene chloride and copolymers thereof with not more than substantially 15 percent of other unsaturated compounds copolymerizable therewith. The copolymers contain at least substantially 85 percent of vinylidene chloride. Suitable comonomers for the copolymerization include, for example, vinyl chloride, vinyl fluoride, vinyl acetate, styrene, acrylic and methacrylic esters such as methyl methacrylate, ethyl methacrylate and the like, acrylonitrile, vinyl-type ethers and ketones such as methylvinyl ether, methylvinyl ketone and related compounds such as methylisopropenyl ketone and the like. For a more complete list of compounds known to copolymerize with vinylidene chloride to produce resins which can be plasticized as herein described see Krczil, "Kurzes Handbuch der Polymerisationstechnik," vol. II "Mehrstoffpolymerization," Edwards Bros., Inc., p. 739, the items indented under "vinylidene chlorid."

The plasticizer of this invention is the di-n-propyl tetrachlorophthalate. It has excellent light stability and good heat stability as well as good spew resistance. It is non-toxic, non-allergenic, and odorless. In addition, it does not appreciably increase the tendency of oriented films or filaments to shrink when exposed to elevated temperatures.

The following example illustrates the preparation of this ester.

DI-N-PROPYL TETRACHLOROPHTHALATE

Five hundred seventy-two grams (2 moles) of tetrachlorophthalic anhydride, 360.5 g. (6 moles) of n-propyl alcohol, and 100 ml. of benzene were placed in a 3 necked-wide angle round bottom flask of 2 l. capacity. One hundred fifty ml. of the alcohol was used to dissolve 10 g. of p-toluene sulfonic acid. The flask was provided with a thermometer, stirrer and connected to an azeotrope trap. Heating was provided by means of a heating mantle.

After several hours refluxing, as there was no aqueous phase separation, 270 ml. of the distillate was removed via the azeotrope trap and 100 ml. more benzene added. Pot temperature of 128° C. provided 4.5 ml. water phase separation in 2 hours and 15 ml. in 10 hours. Seventy-five ml. of the volatile products (propanolbenzene) previously removed were added and reflux resumed. After 20 ml. aqueous phase separated in a total reflux time of 11 hours, 50 ml. more of the solvent mixture was added, and after 27 ml. aqueous phase had been collected in 13 hours another 50 ml. portion of solvent was added. The remaining solvent was added in 50 ml. increments every two hours until a total of 37 ml. of the aqueous phase had been removed in a reflux time of 25 hours. As no more water phase would separate (pot temperature 110° C.) the remaining solvent was stripped off at 100 mm. pressure and the material was washed with aqueous $Na_2CO_3$. This product boiled at 195° C. at 3 mm. and the yield was 466 gms. (60%).

COMPOUNDING AND TESTING

With regard to the use of the plasticizer, a small amount, in the range of 3 to 8 percent or up to 10 percent based on the weight of the resin will generally be found most satisfactory. Less than 3 percent may be used in admixture with another plasticizer. Such percentages will be stably retained within the resin in the finished oriented article. In no case will more than 10 percent of the plasticizer be employed in a vinylidene resin because such larger amounts are incompatible and exude to the surface of oriented products produced from vinylidene polymeric resins containing 85 percent or more of vinylidene chloride.

The di-n-propyl tetrachlorophthalate can be employed with the epoxy heat stabilizers such as glycidyl-phenyl-ether, the mono-, di-, tri-, tetra- and penta-chlorinated derivatives of phenoxypropene oxide, polymeric phenoxy compounds prepared from various dihydroxy phenols and epichlorhydrin, etc. Likewise, it can be employed with the salicylate light stabilizers such as phenyl salicylate, 4-tert-butylphenyl salicylate, 4-octyl phenyl salicylate, 2-methyl phenyl salicylate, 4-chloro phenyl salicylate, 3-methyl phenyl salicylate, 4-t-amyl phenyl salicylate, 4-nonyl phenyl salicylate, 2-octyl-4-methyl salicylate, 2-isopropyl salicylate, nonyl salicylate, ethylhexyl salicylate, n-butyl salicylate, etc.

The di-n-propyl tetrachlorophthalate has been used extensively in extrusions of the resins of this invention employing a variety of different formulae. The tetrachlorophthalate imparts desirable extrusion properties to the resins, is retained in the extruded, oriented products, and has no adverse effect on light or heat stability. Different test results are reported in the following examples:

*Example I*

The tetrachlorophthalate of this invention does not interfere with, and in many cases appears to actually assist, the action of heat and light stabilizers. This is illustrated by data obtained with the composition compounded as follows:

|  | Parts by weight |
|---|---|
| Crystalline resinous copolymer of vinylidene chloride and vinyl chloride (85:15) | 100 |
| Glycidyl phenyl ether | 0 or 2 |
| 4-t-butylphenyl salicylate | 0 or 2 |
| Di-n-propyl tetrachlorophthalate | 8 |

The additives were ball-milled with the resin, and samples tested for heat stability and light stability according to the methods given below.

HEAT STABILITY

Five grams of the composition to be tested were charged into a compression mold of Hastelloy C (a 55/20/6/14/5 Ni/Mo/Fe/Cr/W alloy) in the form of a cylinder 1.25 inches in diameter. The molding cycle was—

1. Heat for three minutes with steam at 120 lbs./sq. in. and mold pressure of 1000 lbs./sq. in.;
2. Water cool for two minutes under 1000 lbs./sq. in. mold pressure; and
3. Eject from the press.

The resultant cylindrical button (1.25 inches in diameter and .125–.188 inch in height) was then cut into sector-shaped specimens which were placed in a forced-draft oven at 180° C. Specimens were removed at intervals of 10, 20 and 30 minutes after placing in the oven, and the behavior of the specimens on the test as a whole was rated by the operator.

LIGHT STABILITY

One gram samples of the composition to be tested were placed between cellophane sheets and pressed in a flat platen laboratory press under a total of 1000 lbs. at a temperature of 180° C., yielding a plaque approximately 6 to 8 mils thick. The plaques were tested according to the method of ASTM test D620–45T under a sunlamp for 240 hours and the results are recorded in column A.

Plaques were also tested in a weatherometer for 100 hours, and 200 hours, the reports of the tests for the respective durations being reported in columns B and C. The weatherometer was a standard X–1–A machine, using a Corex D filter and operating without the sprays.

In the light and heat-stability tests reported in Table I, the results were rated subjectively by the operator as "poor (P), "fair" (F), "good" (G), and "excellent" (E).

SPEW RATING

A plaque of the compounded resin was pressed between cellophane sheets in a Carver press at 180 C., using approximately 1.5 grams of resin, 10 seconds preheat, and 15 seconds with the minimum pressure (pressure indicator just off zero). The plaque was quenched in cold water immediately and an approximately ⅜ inch wide strip was cut from the plaque, the cellophane removed, and the strip oriented to its limit.

The strips were placed in glassine bags under mild pressure so that contact of the strips with the bag was assured. Any exudation of plasticizer could then be noted as an oily streak on the glassine. Tests were carried out at room temperature and at 50° C., the latter condition tending to accentuate any migration of plasticizer. No spew was noted on the test strip at room temperature after 56 days, whereas was dioctyl phthalate definite spew occurred after one day.

The results of spew tests carried out at 50° C. for fifty-six days are given in Table I. "OK" designates that no spew was noticeable on the glassine at the end of the test period, and "NG" indicates the presence of objectionable exudation.

*Table I*

| Plasticizer | GPE | BPS | Stability | | | | Spew Rating |
|---|---|---|---|---|---|---|---|
| | | | Heat | Light | | | |
| | | | | A | B | C | |
| None | 0 | 0 | P | P | P | P | |
| Do | 2 | 2 | G | G | F | F | |
| Dioctylphthalate | 0 | 0 | P | P | P | P | NG. |
| Do | 2 | 2 | F | F | P | P | NG. |
| Di-n-propyl tetrachlorophthalate | 0 | 0 | G | G | F | F | OK. |
| Do | 2 | 2 |  | E | E | E | OK. |

(In the headings, "GPE" stands for glycidyl phenyl ether and "BPS" stands for 4-t-butylphenyl salicylate.)

The di-n-propyl tetrachlorophthalate is shown from the above table to be satisfactory both with and without added heat and light stabilizers. Increasing the vinyl chloride content of a resin gives polymeric products in which plasticizers generally are more compatible.

*Example II.—Extrusion of filaments*

Tests were conducted using various plasticizers with 4 to 8 parts by weight of di-n-propyltetrachlorophthalate, together with 2 parts glycidyl phenyl ether and 2 parts phenyl salicylate as light and heat stabilizers, respectively.

The extrusions were carried out in conventional screw-type machines, the molten polymer being forced through dies to form filaments which were then quenched by passage through a water bath and cold-drawn some 400% by passage over differential speed rolls.

It was observed that with as little as four parts of di-n-propyltetrachlorophthalate smooth filaments were produced readily in gauges from .006 inch to .015 inch without heat degradation. These filaments exhibited no exudation of plasticizer on storage and possessed excellent light stability when exposed to Florida sunshine. They had good heat stability. Extrusions carried out with conventional plasticizers such as di-octylphthalate required at least 8 parts plasticizer to give desirable extrusion characteristics and the filaments on storage in all cases exuded the plasticizer.

A similar extrusion test was made using 6 percent di-n-propyl tetrachlorophthalate, 2% ethylene glycol bis-(alphamethylbenzyl) ether and 2 percent, 2,4-dichlorophenoxypropene oxide with 2 parts of p-tert-butyl phenylsalicylate. The extrusion characteristics were excellent and the spew rating was "OK". In another test using only 4.5 percent of di-n-propyl tetrachlorophthalate and 2 percent 2,4,6-trichlorophenoxypropene oxide with 2 percent p-tert-butylphenylsalicylate the extrusion characteristics were rated "good" and the spew rating was "OK."

What we claim is:

1. In the process of producing films and filaments by extruding and orienting a resin selected from the group consisting of homopolymers of vinylidene chloride and copolymers thereof with up to 15 percent (based on the weight of said copolymers of other unsaturated compounds copolymerized therewith, the improvement which comprises including as a plasticizer in the molten resin in an amount in the range of from 3 to up to 10 percent by weight based on the weight of the resin, of di-n-propyl tetrachlorophthalate whereby a non-exuding extruded, oriented product is obtained.

2. The process of claim 1 in which an epoxy heat stabilizer and a salicylate light stabilizer are included in the molten resin.

3. Oriented film consisting essentially of resin selected from the group consisting of homopolymers of vinylidene chloride and copolymers thereof with up to 15 percent (based on the weight of said copolymers) of other unsaturated compounds copolymerized therewith, which film contains in an amount in the range of from 3 to up to 10 percent by weight based on the weght of the resin, of di-n-propyl tetrachlorophthalate.

4. The film of claim 3 which contains an epoxy heat stabilizer and a salicylate light stabilizer.

5. Oriented filament consisting essentially of resin selected from the group consisting of homopolymers of vinylidene chloride and copolymers thereof with up to 15 percent (based on the weight of said copolymers) of other unsaturated compounds copolymerized therewith, which filament contains in an amount in the range of from 3 to up to 10 percent by weight based on the weight of the resin, of di-n-propyl tetrachlorophthalate.

6. The filament of claim 5 which contains an epoxy heat stabilizer and a salicylate light stabilizer.

7. A plasticized composition comprising a crystalline polymeric resin selected from the group consisting of homopolymers of vinylidene chloride and copolymers thereof with up to 15 percent (based on the weight of said copolymers) of other unsaturated compounds copolymerized therewith and, as plasticizer therefor, di-n-propyl tetrachlorophthalate.

8. A composition according to claim 7, wherein the plasticizer is present in an amount in the range of 3 to up to 10 percent by weight on the polymeric resin.

9. A composition according to claim 7, wherein a light stabilizer for the polymeric resin is present.

10. A composition according to claim 7, wherein the polymeric resin is vinylidene chloride-vinyl chloride copolymer.

11. A composition according to claim 10, wherein the plasticizer is present in an amount in the range of 3 up to 10 percent by weight on the polymeric resin.

12. A plasticized composition comprising a crystalline resinous copolymer of 85% by weight of vinylidene chloride with 15% by weight of vinyl chloride plasticized with 8% by weight on the copolymer of di-n-propyl tetrachlorophthalate and incorporating a light stabilizer.

13. An oriented shaped article consisting essentially of a resin selected from the group consisting of homopolymers of vinylidene chloride and copolymers thereof with up to 15 percent (based on the weight of said copolymers) of other unsaturated compounds copolymerized therewith, which shaped article contains an amount in the range of from 3 to up to 10 percent by weight based on the weight of the resin, of di-n-propyl tetrachlorophthalate.

References Cited in the file of this patent

UNITED STATES PATENTS

| | | |
|---|---|---|
| 2,460,574 | Gresham | Feb. 1, 1949 |
| 2,477,610 | Irons | Aug. 2, 1949 |
| 2,666,040 | Best | Jan. 12, 1954 |
| 2,755,259 | Dilke et al. | July 17, 1956 |

OTHER REFERENCES

Stevenson et al.: Industrial and Engineering Chemistry, volume 42, October 1950, "Dialkyl Tetrachlorophthalates as Plasticizers," pages 2170 to 2175.